US012684476B2

(12) United States Patent
Shah et al.

(10) Patent No.: US 12,684,476 B2
(45) Date of Patent: Jul. 14, 2026

(54) UBIQUITOUS WIRELESS ACCESS NETWORK SELECTION

(71) Applicant: AT&T Intellectual Property I, L.P., Atlanta, GA (US)

(72) Inventors: Ronak Shah, Issaquah, WA (US); Jason Sikes, Carnation, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 387 days.

(21) Appl. No.: 18/476,296

(22) Filed: Sep. 27, 2023

(65) Prior Publication Data

US 2025/0106745 A1 Mar. 27, 2025

(51) Int. Cl.
H04W 48/18 (2009.01)
H04W 76/10 (2018.01)

(52) U.S. Cl.
CPC ........... *H04W 48/18* (2013.01); *H04W 76/10* (2018.02)

(58) Field of Classification Search
CPC ...... H04W 48/18; H04W 76/10; H04W 24/08
USPC ........................................... 370/329
See application file for complete search history.

(56) References Cited

U.S. PATENT DOCUMENTS

2015/0087355 A1* 3/2015 Jouin .................... G06F 3/0484
455/552.1

* cited by examiner

*Primary Examiner* — Huy C Ho

(57) ABSTRACT

A processing system including at least one processor of an endpoint device may obtain performance information of a plurality of wireless access networks in a vicinity of the endpoint device and receive a service request from a first process in operation on the endpoint device. The processing system may then select in response to the service request, a first wireless access network of the plurality of wireless access networks for the first process based upon the performance information of the plurality of wireless access networks and establish a communication session for the first process via the first wireless access network.

20 Claims, 4 Drawing Sheets

300

Figure 3:
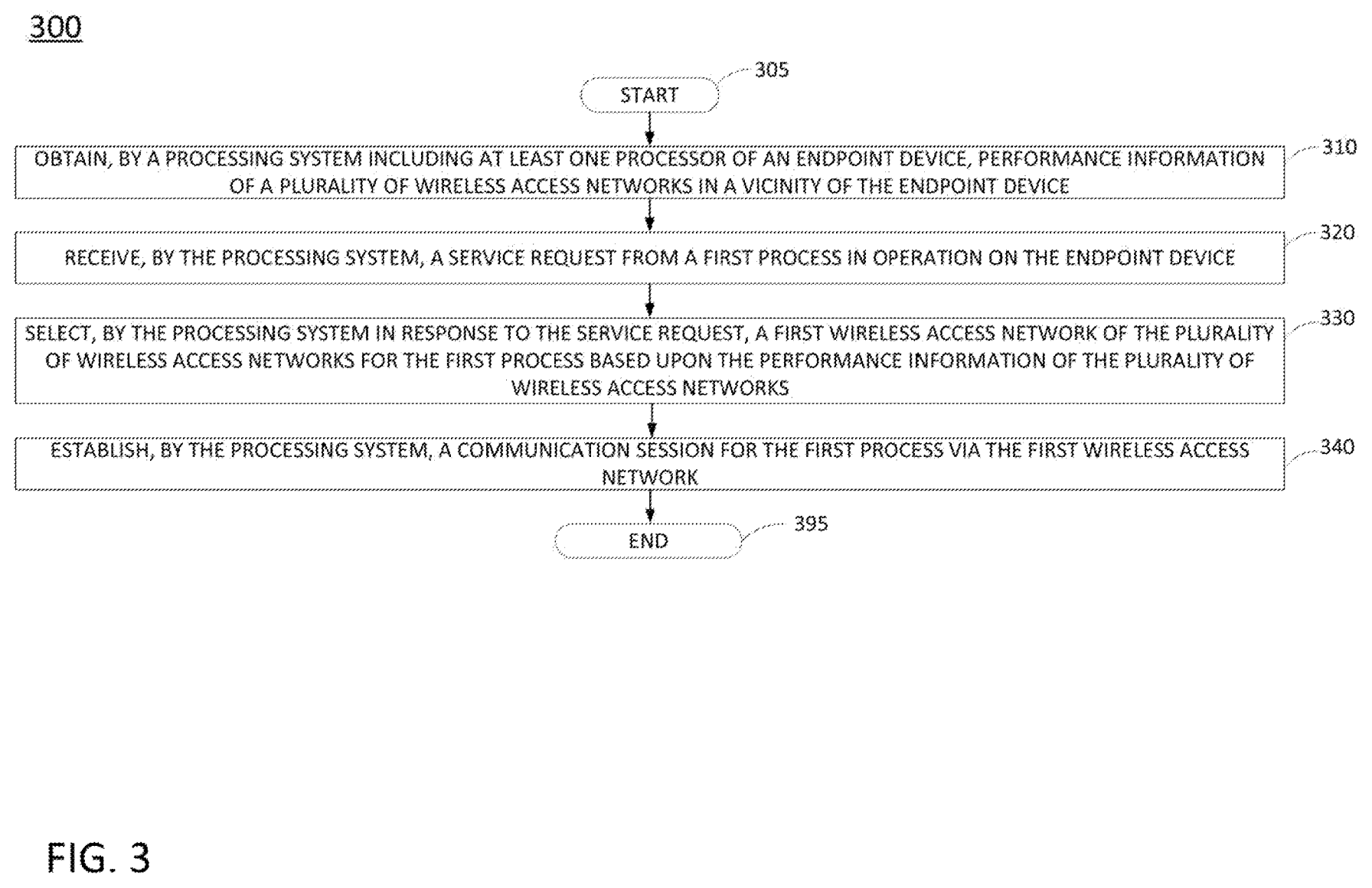

300

( START ) — 305

310 — OBTAIN, BY A PROCESSING SYSTEM INCLUDING AT LEAST ONE PROCESSOR OF AN ENDPOINT DEVICE, PERFORMANCE INFORMATION OF A PLURALITY OF WIRELESS ACCESS NETWORKS IN A VICINITY OF THE ENDPOINT DEVICE

320 — RECEIVE, BY THE PROCESSING SYSTEM, A SERVICE REQUEST FROM A FIRST PROCESS IN OPERATION ON THE ENDPOINT DEVICE

330 — SELECT, BY THE PROCESSING SYSTEM IN RESPONSE TO THE SERVICE REQUEST, A FIRST WIRELESS ACCESS NETWORK OF THE PLURALITY OF WIRELESS ACCESS NETWORKS FOR THE FIRST PROCESS BASED UPON THE PERFORMANCE INFORMATION OF THE PLURALITY OF WIRELESS ACCESS NETWORKS

340 — ESTABLISH, BY THE PROCESSING SYSTEM, A COMMUNICATION SESSION FOR THE FIRST PROCESS VIA THE FIRST WIRELESS ACCESS NETWORK ( END ) — 395

UBIQUITOUS WIRELESS ACCESS NETWORK SELECTION

The present disclosure relates generally to multi-access technologies and cellular offloading, and more specifically to methods, computer-readable media, and apparatuses for establishing a communication session for a first process in operation on an endpoint device via a first wireless access network that is selected based upon performance information of a plurality of wireless access networks.

BACKGROUND

Endpoint devices may be equipped with dual/multiple access technologies, e.g., cellular and non-cellular wireless access technologies. However, the user is generally responsible to choose between a cellular radio access network (RAN) or a non-cellular wireless access network (e.g., IEEE 802.11/Wi-Fi, etc.).

SUMMARY

In one example, the present disclosure describes a method, computer-readable medium, and apparatus for establishing a communication session for a first process in operation on an endpoint device via a first wireless access network that is selected based upon performance information of a plurality of wireless access networks. For instance, in one example, a processing system including at least one processor of an endpoint device may obtain performance information of a plurality of wireless access networks in a vicinity of the endpoint device and receive a service request from a first process in operation on the endpoint device. The processing system may then select in response to the service request, a first wireless access network of the plurality of wireless access networks for the first process based upon the performance information of the plurality of wireless access networks and establish a communication session for the first process via the first wireless access network.

BRIEF DESCRIPTION OF THE DRAWINGS

The present disclosure can be readily understood by considering the following detailed description in conjunction with the accompanying drawings, in which:

FIG. 3 illustrates a flowchart of an example method for establishing a communication session for a first process in operation on an endpoint device via a first wireless access network that is selected based upon performance information of a plurality of wireless access networks, in accordance with the present disclosure.

To facilitate understanding, identical reference numerals have been used, where possible, to designate identical elements that are common to the figures.

DETAILED DESCRIPTION

Figure 1:
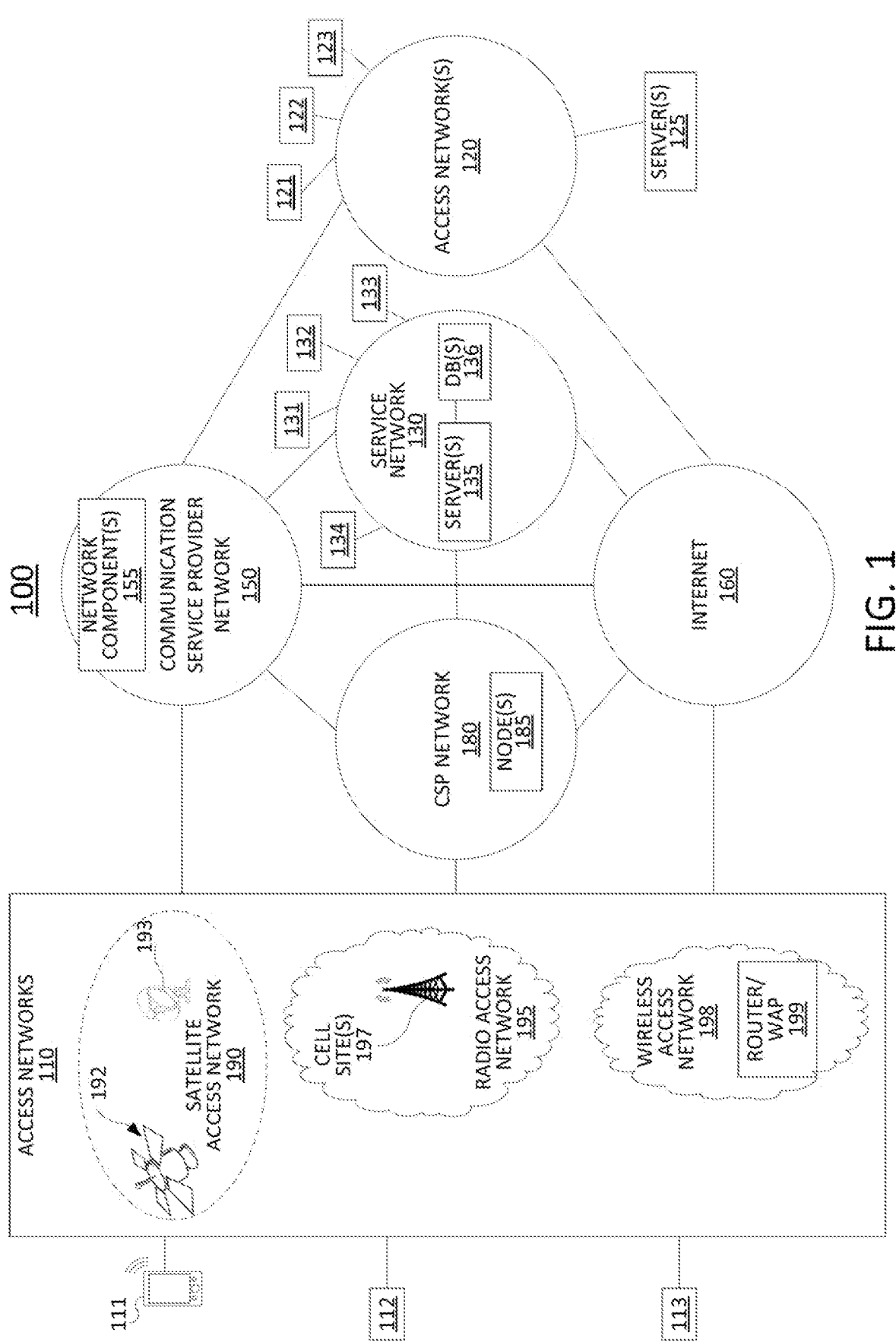
FIG. 1 illustrates one example of a system related to the present disclosure.

The present disclosure broadly discloses methods, non-transitory (i.e., tangible or physical) computer-readable storage media, and apparatuses for establishing a communication session for a first process in operation on an endpoint device via a first wireless access network that is selected based upon performance information of a plurality of wireless access networks. In particular, to manage wireless spectrum capacity, a mobile network operator (MNO) may generally prefer that endpoint devices are using the most efficient access technology. However, endpoint devices equipped with dual/multiple access technologies have deferred to the user as the final decision maker on what access technology to use for network connectivity. For instance, the user may be responsible to choose between a cellular radio access network (RAN) or a non-cellular wireless access network (e.g., IEEE 802.11/Wi-Fi, etc.).

Examples of the present disclosure provide an endpoint device-based selection of a wireless access network from among various available wireless access networks that may be within a vicinity of an endpoint device (e.g., within wireless communication range and/or at least within wireless detection/sensing range). In one example, the present disclosure may comprise a component of, or may be integrated with a mobile chipset of an endpoint device that is equipped with dual/multiple access technologies (e.g., a multi-modality wireless endpoint device). In one example, the present disclosure may maintain an inventory of wireless access networks and update quality metrics on an ongoing basis (e.g., in "real-time" or as current as practicable). In addition, in one example, access availability information may be shared with applications on the endpoint device in terms of the supported services. Alternatively, or in addition, examples of the present disclosure may also accept network access requests from processes/applications and may allocate connections via wireless access networks selected in accordance with the quality metrics and the requirements or preferences of the different applications.

In one example, the present disclosure may include a connectivity platform module, which may reside in the communication processing unit (e.g., a mobile chipset) of an endpoint device (e.g., a user equipment (UE)). The connectivity platform may (1) maintain and broadcast service-specific access quality information and availability to applications, processes, and/or services on the endpoint device, (2) interface with wireless access networks and monitor the quality and availability (e.g., on an ongoing basis), and (3) perform service-based intelligent wireless access network selection and connection establishment.

The function of maintaining and broadcasting the availability status and usability and/or quality of available wireless access networks may be achieved by maintaining an access inventory within the connectivity platform. The connectivity platform may also map available wireless access networks to service-specific preferences/requirements within the endpoint device. In one example, all or a portion of this information may also be shared or made available to all applications or selected applications on the endpoint device. The access inventory may interact with a status reporter module within the connectivity platform to obtain availability and quality information for each wireless access network.

For instance, the status reporter module may interface with the wireless access networks to monitor quality/availability. For example, the status reporter module may poll each wireless access network and/or may receive performance data from each wireless access network (e.g., one or more of the wireless access networks may broadcast current/most recently available performance data). Alternatively, or in addition, the status reporter module may interact with a connectivity engine to determine the quality of one or more wireless access networks. For instance, the status reporter module may establish test connections with one or more wireless access networks and may measure one or more network performance indicators (e.g., to obtain one or more network performance indicator metrics). To further illustrate, the status reporter module may apply one or more test protocols associated with different applications or application types via the respective test connections with the different wireless access networks.

In one example, a connectivity engine may perform service-based intelligent access allocation. For instance, the connectivity engine may map one or more wireless access networks to an application/service requesting network access. In one example, the connectivity engine may apply one or more artificial intelligence (AI)/machine learning (ML) algorithms to select the appropriate wireless access network(s) from among a plurality of available wireless access networks. In one example, the connectivity engine may also interface with a service provider billing system, an access network discovery service function (ANDSF), or others, may utilize location information, and/or may detect service preferences/requirements to select a wireless access network for the service. In addition, in one example, the connectivity engine may use more than one wireless access network, or may delay access to achieve performance and/or user experience target(s). These and other aspects of the present disclosure are discussed in greater detail below in connection with the examples of FIGS. 1-4.

To aid in understanding the present disclosure, FIG. 1 illustrates an example system 100 comprising a plurality of different networks in which examples of the present disclosure for may operate. Communication service provider network 150 may comprise a core network with components for telephone services, Internet services, and/or video services (e.g., triple-play services, etc.) that are provided to customers (broadly "subscribers"), and to peer networks. In one example, communication service provider network 150 may combine core network components of a cellular network with components of a triple-play service network. For example, communication service provider network 150 may functionally comprise a fixed-mobile convergence (FMC) network, e.g., an IP Multimedia Subsystem (IMS) network. In addition, communication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VOIP) telephony services. Communication service provider network 150 may also further comprise a broadcast television network, e.g., a traditional cable provider network or an Internet Protocol Television (IPTV) network, as well as an Internet Service Provider (ISP) network. With respect to video service provider functions, communication service provider network 150 may include one or more video servers (e.g., television servers) for the delivery of video content, e.g., a broadcast server, a cable head-end, a video-on-demand (VOD) server, and so forth. For example, communication service provider network 150 may comprise a video super hub office, a video hub office and/or a service office/central office.

In one example, communication service provider network 150 may also include one or more network components 155. In one example, the network component(s) 155 may each comprise a computing system, such as computing system 400 depicted in FIG. 4, and may be configured to host one or more communication network components. For example, a first communication network component may comprise a database of assigned telephone numbers, a second communication network component may comprise a database of basic customer account information for all or a portion of the customers/subscribers of the communication service provider network 150, a third communication network component may comprise a cellular network service home location register (HLR), e.g., with current serving base station information of various subscribers, and so forth. Other communication network components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other communication network components may include, for example, a layer 3 router, a short message service (SMS) server, a voicemail server, a video-on-demand server, a server for network traffic analysis, a database server/database system, and so forth. It should be noted that in one example, a communication network component may be hosted on a single server, while in another example, a communication network component may be hosted on multiple servers, e.g., in a distributed manner. For ease of illustration, various other components of communication service provider network 150 are omitted from FIG. 1.

In one example, various components of communication service provider network 150 comprise network function virtualization infrastructure (NFVI), e.g., software defined network (SDN) host devices (i.e., physical devices) configured to operate as various virtual network functions (VNFs), such as a Short Message Service (SMS) server, a voicemail server, a video-on-demand server, etc. For instance, network component(s) 155 may represent any one or more NFVI/SDN host devices configured to operate as any one or more of such VNFs. Similarly, in an example in which communication service provider network 150 may comprise a cellular core network (e.g., an evolved packet core (EPC), a 5G core or the like), network component(s) 155 may represent NFVI hosting one or more of a virtual MME (vMME), a virtual HHS (vHSS), a virtual serving gateway (vSGW), a virtual packet data network gateway (vPGW), and so forth. Thus, for example, network component(s) 155 may comprise a vMME, a vSGW, a virtual access management function (AMF), a virtual network slice selection function (NSSF), a virtual user plane function (UPF), and so forth, Access networks 110 and 120 may transmit and receive communications between devices 111-113 and devices 121-123 among one another and/or with service network 130, and between communication service provider network 150 and devices 111-113 and 121-123 relating to voice telephone calls, communications with web servers via the Internet 160, and so forth. Access networks 110 and 120 may also transmit and receive communications between devices 111-113, 121-123 and other networks and devices via Internet 160. Devices 111-113 may each comprise an endpoint device, e.g., a mobile/wireless endpoint device, such as a cellular smart phone, a laptop, a tablet computer, etc., that is capable of multiple wireless communication modalities. Similarly devices 121-123 may each comprise an endpoint device, e.g., a mobile/wireless endpoint device, such as a cellular smart phone, a laptop, a tablet computer, etc. However, in the example of FIG. 1, devices 121-123 may alternatively or additionally include one or more routers, gateways, servers (e.g., web servers, video and/or other content servers, conference servers, and so forth), desktop computers, a plurality or cluster of such devices, televisions (TVs), e.g., a "smart" TV, set-top boxes (STBs), or the like.

In one example, access networks 110 may include a cellular access network (e.g., radio access network 195), implementing such technologies as: 3$^{rd}$ Generation Partnership Project (3GPP) 5G new radio (NR) and/or Long Term Evolution (LTE) access technologies, global system for mobile communication (GSM), e.g., a base station subsystem (BSS), GSM enhanced data rates for global evolution (EDGE) radio access network (GERAN), or a UMTS terrestrial radio access network (UTRAN) network, among others, where communication service provider network 150 may provide core network functions, e.g., of a public land mobile network (PLMN)-universal mobile telecommunications system (UMTS)/General Packet Radio Service (GPRS) core network, or the like. In this regard, radio access network 195 may include one or more cell sites 197, which may include antenna arrays (e.g., remote radio heads (RRHs), base station equipment and/or one or more components thereof (e.g., a distributed unit (DU) and/or centralized unit (CU), etc.), transformers, battery units, and/or or other power equipment, and so forth.

In the example of FIG. 1, access networks 110 may also include a satellite access network 190, with a satellite 192 and a ground station 193. For instance, ground station 193 may receive video content (e.g., from one or more video servers, such as network components 155) for uplink transmission to satellite 192. Accordingly, satellite 192 may receive video content from ground station 193 and may broadcast the video content to any of the endpoint devices 111-113 within a coverage area of satellite 192 (and which are satellite communication capable). In one example, satellite access network 190 may also convey other types of downlink and/or uplink data for any of the endpoint devices 111-113 that are capable of receiving and or transmitting via satellite access. In one example, satellite access network 190 may be controlled and/or operated by a same network service provider as the communication service provider network 150. In another example, satellite access network 190 may be controlled and/or operated by a different entity and may carry video broadcast signals (and/or other communications) on behalf of communication service provider network 150.

In the example of FIG. 1, access networks 110 may also include a non-cellular wireless access network 198, which may include a customer premises network (e.g., a local area network (LAN), a home network, an enterprise network, etc.) having at least one wireless access point (WAP) 199, e.g., a wireless router. For instance, WAP 199 may comprise an Institute for Electrical and Electronics Engineers (IEEE) 802.11 (Wi-Fi) router (in one example, WAP may further comprise a wired Ethernet router or the like, e.g., a dual wired/wireless router). In one example, wireless access network 198 may provide wide area network (WAN) connectivity via a Digital Subscriber Line (DSL) network, a broadband cable access network, a fiber-optic access network, or the like (broadly, an internet service provider ISP) network). Although access networks 110 include three example access networks as illustrated in FIG. 1, it should be understood that access networks 110 may include one or more additional non-cellular wireless access networks, one or more additional cellular access networks (e.g., RAN(s)), one or more additional satellite access networks, and so forth.

In one example, access networks 120 may include access networks of the same or similar types as access networks 110 (e.g., one or more non-cellular wireless access networks, one or more cellular access networks (e.g., RAN(s)), one or more satellite access networks, and so forth. In one example, one or more of the access networks 110 and 120 may be operated by the same or a different service provider from a service provider operating the communication service provider network 150. For example, one or more of access networks 120 may comprise an Internet service provider (ISP) network, a cable access network, and so forth. For instance, one or more of access networks 120 may comprise a wired access network, e.g., a Digital Subscriber Line (DSL) network, a broadband cable access network, a Local Area Network (LAN), a fiber-optic access network, a 3$^{rd}$ party network, and so forth. For example, for a fiber-optic access network, the access network may include a mini-fiber node (MFN), a video-ready access device (VRAD) or the like. However, in another example, such an intermediate node may be omitted, e.g., for fiber-to-the-premises (FTTP) installations.

In one example, access networks 110 and 120 may include customer premises networks, e.g., a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the devices 111-113 and 121-123, respectively. In this regard, it should be noted that in some examples, devices 111-113 and 121-123 may connect to access networks 110 and 120 via one or more intermediate devices, such as a gateway and router, e.g., where access networks 110 and 120 comprise cellular access networks, ISPs and the like, while in another example, devices 111-113 and 121-123 may connect directly to access networks 110 and 120, e.g., where access networks 110 and 120 may comprise local area networks (LANs), enterprise networks, and/or home networks, and the like.

In one example, system 100 may also include a cloud service provider (CSP) network 180 having one or more host devices, or nodes 185, which may each comprise networked computing resources for providing cloud services directly on behalf of CSP network 180 and/or for third parties having project development environments, data storage, and/or applications/services hosted via CSP network 180. For instance, node(s) 185 may comprise public or private cloud computing resources in one or more data centers, such as central processing units (CPUs), graphics processing units (GPUs), memory, storage devices, and so forth. The computing resources may operate as servers for hosting virtual machines, containers, microservices, or the like providing various applications, may operate as storage systems for storing databases, data tables, graphs, and so on. In one example, CSP network 180 may comprise a content distribution network (CDN) or at least a portion thereof. In various examples, CSP network 180 may be provided by a same entity as communication service provider network 150 or a different entity. It should also be noted that in one example, access networks 110 and/or 120 may comprise "edge clouds" which may similarly include host devices/nodes for providing cloud services such as mentioned above, but in locations that may be physically closer to various endpoint devices that may utilize such services.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the communication service provider network 150. For example, the service network 130 may comprise one or more devices for providing services to subscribers, customers, and/or users. For example, communication service provider network 150 may provide a cloud storage or other cloud computing services, web server hosting, and other services. As such, service network 130 may represent aspects of communication service provider network 150 where infrastructure for supporting such services may be deployed. In another example, service network 130 may provide network management (e.g., including outage monitoring, troubleshooting, remediation, etc.) as a service to various other entities. For instance, in a managed information technology (IT) scenario, a provider and consumer enter into an agreement for proactive monitoring and support for managed assets (broadly, network elements).

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the communication service provider network 150, devices 131-134 of the service network 130 may comprise devices of network personnel, such as network operations personnel and/or personnel for network maintenance, network repair, construction planning, customer service, and so forth.

In the example of FIG. 1, service network 130 may include one or more servers 135 which may each comprise all or a portion of a computing device or system, such as computing system 400, and/or processing system 402 as described in connection with FIG. 4 below, specifically configured to perform various steps, functions, and/or operations in connection with examples of the present disclosure for establishing a communication session for a first process in operation on an endpoint device via a first wireless access network that is selected based upon performance information of a plurality of wireless access networks. For example, one of the server(s) 135, or a plurality of servers 135 collectively, may perform operations in connection with the example method 300 of FIG. 3, or as otherwise described herein. For instance, the one or more of the servers 135 may represent a conference server (e.g., for audio and/or online conferencing), a machine learning development platform, and so forth.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of systems for establishing a communication session for a first process in operation on an endpoint device via a first wireless access network that is selected based upon performance information of a plurality of wireless access networks, as described herein. As just one example, DB(s) 136 may further store a wireless network inventory comprising geographic features, such as an access element location (e.g., coordinates, building location, floor location within building, etc. for a base station, wireless router, wireless access point, or the like), a site type, a location class (e.g., urban, suburban, rural, etc.), etc., and asset attributes/features, such as: an access network element type (e.g., an asset class), a version, etc., a nominal capacity (e.g., manufacturer and/or operator advertised average and peak throughput, transmit and/or receive power, range, number of endpoint devices serviceable, etc.), or security features (e.g., a preferred encryption protocol, available encryption protocols, etc.).

In addition, DB(s) 136 may be configured to receive, create, and/or store performance records relating to various wireless access networks (e.g., access networks 110). For instance, performance records may include performance indicator metrics, e.g., measurements or aggregate measurements of various performance indicators (e.g., "key performance indicators" (KPIs)), such as: bandwidth, throughput, latency, packet loss, round trip time (RTT), and so forth. In one example, the performance indicator metrics may include measurements over one or more time intervals, e.g., peak throughput in 5 minute intervals, average throughput in five minute intervals, average 5 minute throughput over 24 hour time periods, etc., and similarly for other performance metrics. In addition, performance records may include outage records, e.g., a timestamp of an outage, a time to resolve the outage, etc., and/or aggregate outage information, e.g., an outage frequency, an average outage duration, etc., outage metrics over one or more time intervals, and so forth. In one example, performance records may include one or more availability metrics (e.g., a ratio of attempted connections to a wireless access network to completed connected by wireless endpoint devices, or multiple ratios with respect to different time intervals, times of day, days of the week, different endpoint device types (e.g., smartphones versus smartwatches or other wearable computing devices, different models of smartphones, different operating systems, etc.)). The performance records may be obtained from network components 155 and/or from access network elements. In one example, the performance records may alternatively or additionally be obtained from reporting endpoint devices (e.g., one or more of devices 111-113 in the example of FIG. 1).

In one example, for access networks that may be operated by a same network operator associated with service network 130, the wireless access network performance records may include (e.g., for one or more of the access networks 110) radio access network (RAN) metrics, such as peak or average number of radio access bearers, average or peak upload or download data volumes per bearer and/or per connected user equipment (UE)/endpoint device, metrics that may be used for intrusion detection/alerting, such as peak or average number of connection requests to a server, link utilization metrics (e.g., peak or average bandwidth utilization in terms of total volume or percentage of maximum link capacity), etc. In this regard, server(s) 135 and/or DB(s) 136 may poll and/or may receive/subscribe to updates from one or more access network elements from access networks 110 for performance metrics and/or for other operational data (such as changes in deployment location, security protocols, updates, new access element equipment, etc.).

Similarly, DB(s) 136 may receive and store weather data or the like from a device of a third-party, e.g., a weather service, etc. via one of access networks 120. For instance, one of the devices 121-123 may represent a weather data server (WDS). In one example, the weather data may be received via a weather service data feed, e.g., an NWS extensible markup language (XML) data feed, or the like. In another example, the weather data may be obtained by retrieving the weather data from the WDS. In one example, DB(s) 136 may receive and store weather data from multiple third-parties.

In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like. In this regard, server(s) 135 and/or DB(s) 136 may maintain communications with one or more of the devices 111-113 and/or devices 121-123 via access networks 110 and 120, communication service provider network 150, Internet 160, and so forth, e.g., in order to collect, maintain, and/or update wireless network inventory information, wireless network performance information, etc. and to communicate such information to various endpoint devices for establishing a communication session for a first process in operation on an endpoint device via a first wireless access network that is selected based upon performance information of a plurality of wireless access networks.

In an illustrative example, device 111 (broadly an endpoint device or a multi-modality wireless endpoint device) may comprise all or a portion of a computing device or system, such as computing system 400, and/or processing system 402 as described in connection with FIG. 4 below, specifically configured to perform various steps, functions, and/or operations for establishing a communication session for a first process in operation on an endpoint device via a first wireless access network that is selected based upon performance information of a plurality of wireless access networks, e.g., in accordance with the example method 300 of FIG. 3, or as otherwise described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

To further illustrate, device 111 may engage in a process on an ongoing basis to obtain performance information of a plurality of wireless access networks in a vicinity of the device 111, e.g., access networks 110 in the example of FIG. 1. For instance, in one example, device 111 may receive a plurality of broadcasts from the plurality of wireless access networks, each broadcast of the plurality of broadcasts comprising respective performance information for a respective one of the plurality of wireless access networks. Alternatively, or in addition, device 111 may establish connections to one or more of the access networks 110 and may measure at least one network performance indicator for each wireless access network, e.g., to obtain respective network performance indicator metrics for at least one network performance indicator. For instance, device 111 may apply one or more test protocols associated with one or more applications and/or processes (or application/process types, such as a "video process type," "voice process type," "gaming process type," "messaging process type," "general purpose process type," etc.). For instance, a test protocol may include communications to a first network-based server via each respective wireless access network, and measuring one or more network performance indicators (e.g., obtaining one or more network performance indicator measurements/metrics in accordance therewith). In one example, device 111 may close each connection after the measuring task is completed.

Device 111 may then store the performance information or aggregate metrics based on the received performance information (which itself may also be referred to as performance information/performance metrics). In addition, device 111 may receive a service request from a first process in operation on the endpoint device 111, e.g., a request to establish a connection to a remote device and/or a request that involves a requirement to establish a network connection. The first process may be a service, process, thread, or the like that is associated with a device application, such as a video streaming application, a web browsing application, a gaming application, a social medial application, a messaging application, an online conferencing application, and so forth. In response, device 111 may select a wireless access network of the plurality of wireless access networks for the process based upon the performance information of the plurality of wireless access networks.

For example, device 111 may implement a selection function associated with the first process, e.g., where device 111 stores a plurality of selection functions associated with a plurality of processes in operation on device 111. For instance, in one example, the selection function may be associated with a first process type and device 111 may store a plurality of selection functions associated with a plurality of process types, such as a "video process type," "voice process type," "gaming process type," "messaging process type," "general purpose process type," etc. Device 111 may then establish a communication session for the first process via the wireless access network that is selected. In one example, device 111 may communicate with a respective wireless access point (e.g., a base station, wireless router, etc.) to establish one or more parameters of the communication session, such as a requested bandwidth, quality of service (QoS) and/or priority, etc. It should be noted that device 111 may follow a similar process for other processes/applications that may be in operation at a same or a different time as the first process while device 111 is at a same or different location and with the availability of the same or different wireless access networks. Other, further, and additional or alternative aspects of establishing a communication session for a first process in operation on an endpoint device via a first wireless access network that is selected based upon performance information of a plurality of wireless access networks are described in greater detail below in connection with the examples of FIGS. 2 and 3.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in communication service provider network 150, and so forth. Thus, these and other modifications are all contemplated within the scope of the present disclosure.

Figure 2:
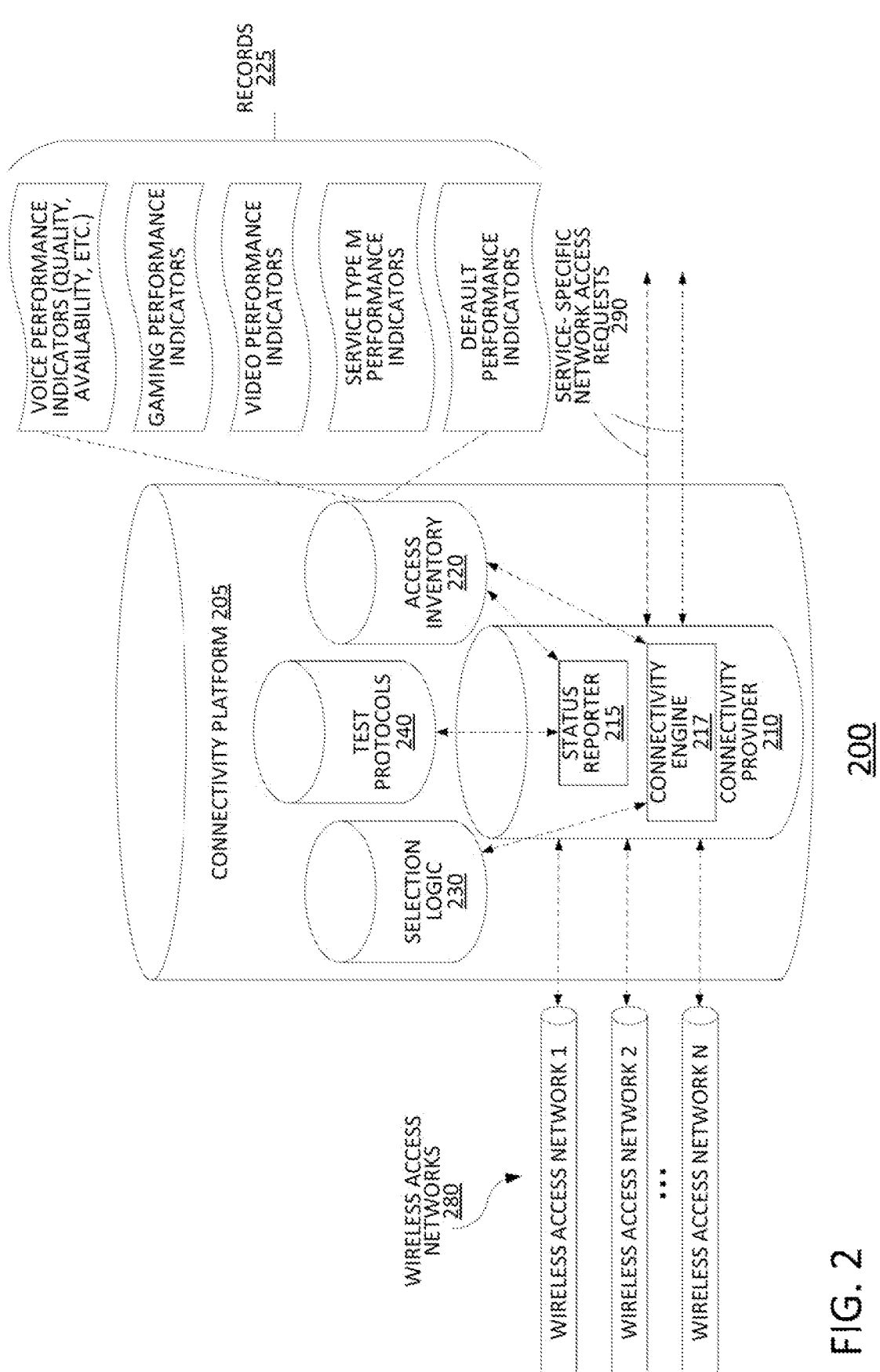
FIG. 2 illustrates an example architecture for a connectivity platform of an endpoint device in accordance with the present disclosure.

FIG. 2 illustrates an example architecture 200 for a connectivity platform 205 of an endpoint device in accordance with the present disclosure. For example, the connectivity platform 205 may reside in the mobile chipset of a dual/multi-modality wireless endpoint device. As illustrated in FIG. 2, the function of maintaining and broadcasting the availability status and usability and/or quality of available access networks may be achieved by maintaining an access inventory 220 within the connectivity platform 205. The connectivity platform 205 may also map available wireless access networks to service-specific preferences/requirements within the endpoint device, e.g., selection logic 230. In one example, all or a portion of this information may also be shared or made available to all applications or selected applications on the endpoint device. The access inventory 220 may interact with a status reporter module 215 within the connectivity provider function 210 to obtain availability and quality information for each of wireless access networks 280 (e.g., wireless access networks 1-N).

For instance, the status reporter module 215 may interface with the wireless access networks 280 to monitor quality/availability. For example, the status reporter module 215 may poll each of the wireless access network 280 and/or may receive performance data from each of the wireless access networks 280 (e.g., one or more of the wireless access networks 280 may broadcast current/most recently available performance data). Alternatively, or in addition, the status reporter module 215 may interact with the connectivity provider function 210 to determine the quality of one or more of the wireless access networks 280. For instance, the status reporter module 215 may establish test connections with one or more of the wireless access networks 280 any may measure one or more network performance indicators (e.g., to obtain one or more network performance indicator metrics). To further illustrate, the status reporter module 215 may apply one or more test protocols 240 associated with different applications or application types via the respective test connections with the different wireless access networks 280. For example, test protocols 240 may be associated with one or more applications and/or processes (or application/process types, such as a "video process type," "voice process type," "gaming process type," "messaging process type," "general purpose process type," etc.). For instance, a test protocol may include communications to a first network-based server to be performed via respective wireless access networks (e.g., each of the wireless access networks 280 in the example of FIG. 2), and measuring one or more network performance indicators (e.g., obtaining one or more network performance indicator measurements/metrics in accordance therewith). Status reporter module 215 may then store the performance information or aggregate metrics based on the received performance information (which itself may also be referred to as performance information/performance metrics), e.g., in records 225 in access inventory 220. As illustrated in FIG. 2, records 225 may be organized by process/service/application type, e.g., with sub-records containing performance indicators for respective ones of the wireless access networks 280 relating to voice, gaming, video, etc. up to "M" different process/service/application types. In one example, access inventory 220 may also store records for a "default" process/service/application type (e.g., for processes/services/applications that are not otherwise designated; for example, these may be without dedicated test protocols and/or selection logic). In another example, the access inventory may store records 225 in a different format, such as by wireless access network (e.g., where records relating to a first wireless access network may include sub-records for different test protocols (e.g., for different processes/services/applications)).

In one example, a connectivity engine 217 of the connectivity provider function 210 may perform service-based intelligent access allocation. For instance, the connectivity engine 217 may map one or more of the wireless access networks 280 to an application/service requesting network access (e.g., indicated in FIG. 2 by service-specific network access requests 290), e.g., in accordance with selection logic 230. For instance, selection logic 230 may comprise respective rule sets, formulas, decision processes, or the like, and/or one or more artificial intelligence (AI)/machine learning (ML) algorithms to select the appropriate wireless access network(s) from among the available wireless access networks 280. In one example, the connectivity engine 217 may also interface with a service provider billing system, an access network discovery service function (ANDSF), or other external entities, may utilize location information, weather information, etc. and/or may detect service preferences/requirements to select a wireless access network for each of the service-specific network access requests 290. In addition, in one example, the connectivity engine 217 may use more than one of the wireless access networks 280, or may delay access to achieve performance and/or user experience target(s).

It should be noted that as referred to herein, a machine learning model (MLM) (or machine learning-based model), may comprise a machine learning algorithm (MLA) that has been "trained" or configured in accordance with input data (e.g., training data) to perform a particular service, e.g., to select a wireless access network from among a plurality of available wireless access networks for a particular requesting application/service, to provide matching scores for available wireless access networks in order to select one (or more) of the wireless access networks for a particular requesting application/service, or the like. Examples of the present disclosure may incorporate various types of MLAs/models that utilize training data, such as support vector machines (SVMs), e.g., linear or non-linear binary classifiers, multi-class classifiers, deep learning algorithms/models, such as deep learning neural networks or deep neural networks (DNNs), generative adversarial networks (GANs), decision tree algorithms/models, k-nearest neighbor (KNN) clustering algorithms/models, a random forest model, a convolutional neural network (CNN), such as an AlexNet model, a WaveNet model, or the like, a recurrent neural network (RNN), a long short-term memory (LSTM) model, and so forth. In one example, the MLA may incorporate an exponential smoothing algorithm, reinforcement learning (e.g., using positive and negative examples after deployment as a MLM), and so forth. In one example, an MLM of the present disclosure may be in accordance with a MLA/MLM template from an open source library, such as OpenCV, which may be further enhanced with domain specific training data.

In one example, the selection logic 230 may include respective selection logic for different applications and/or for different application classes. In one example, through machine learning algorithm (MLA)/MLM training, the selection logic may be trained to learn feature importance (e.g., rankings) and to generate scores for each access network in accordance with performance data collected from the respective access networks 280. In one example, training data may include labeled examples, e.g., where wireless access networks may be selected by a user, by network personnel responsible for model training, etc. Alternatively, or in addition, an operator may define selection logic 230, e.g., a rule set, a decision tree algorithm (that may be pre-configured rather than learned), etc. At least some of the training data may be used as testing data. For instance, the trained MLM may then be applied to testing data (e.g., associated with one or more historical instances of wireless access network selection) to output respective network selections, which may be compared to the verified network selections to obtain an accuracy of the MLM. In one example, the MLM may continue to be trained with additional training data, and tested with additional testing data until a threshold accuracy is achieved. In one example, the MLM may be trained with a loss function that is applied to verified wireless network selections.

In one example, the factors/features for wireless access network selection may include performance indicators (e.g., KPIs) as described above (and in one example, which may be stored in access inventory 220). In one example, the factors/features may further include time factor(s)/feature(s) (such as: year, quarter, month, domestic and international holiday, weekend and weekday, outside and inside business hours, or the like), geographic features (e.g., a state, county, or other geographic bounds in which an access element (e.g., base station, wireless router/AP, etc.) is located, whether a physical location of the access element is urban, suburban, rural, etc.), whether the endpoint device is indoors or outdoors, whether the endpoint device is at ground level, below ground, several stories above ground, etc., whether the physical location is on a rooftop, or the like, weather data, and so forth.

To further illustrate, connectivity engine 217 may apply respective input data sets (e.g., input vectors) associated with respective ones of the wireless access networks 280 to the selection logic corresponding to a requesting application/service (e.g., one of a plurality of selection logics stored in selection logic 230) to obtain corresponding output scores/rankings of the respective ones of the wireless access networks 280. Then, a wireless access network with a highest score (or in another example, a lowest score) may be selected for establishing a connection to one or more remote hosts/servers for the application/service. It should be noted that in another example, connectivity engine 217 may apply the input vector(s) to one or more selection logics from selection logic 230 on an ongoing basis (e.g., not in connection with any particular service request). For instance, in accordance with a selection logic associated with a "video process type," connectivity engine 217 may select one of the wireless access networks 280 to be used for any forthcoming requests from a process associated with a video application. In one example, the selection may be stored in the access inventory 220, e.g., in records 225. In one example, connectivity engine 217 may store a list, e.g., a ranked list of wireless access networks for each process/application/service type. As such, when service-specific network access requests 290 are received, connectivity engine 217 may refer to the stored lists in access inventory 220 to select the appropriate wireless access network based on the stored rankings. Thus, these and other modifications are all contemplated within the scope of the present disclosure.

FIG. 3 illustrates a flowchart of an example method 300 for establishing a communication session for a first process in operation on an endpoint device via a first wireless access network that is selected based upon performance information of a plurality of wireless access networks. In one example, steps, functions, and/or operations of the method 300 may be performed by a device as illustrated in FIG. 1, e.g., one of devices 111-113, or the like. In one example, the steps, functions, or operations of method 300 may be performed by a computing device or system 400, and/or a processing system 402 as described in connection with FIG. 4 below. For instance, the computing device 400 may represent at least a portion of a dual/multi-modality wireless endpoint device, in accordance with the present disclosure. For illustrative purposes, the method 300 is described in greater detail below in connection with an example performed by a processing system. The method 300 begins in step 305 and proceeds to step 310.

At step 310, the processing system of an endpoint device obtains performance information of a plurality of wireless access networks in a vicinity of the endpoint device. For instance, the processing system may comprise a mobile chipset of the dual/multi-modality wireless endpoint device, e.g., including at least one or more processors, cores, or the like, a memory comprising instructions, code, etc., and so forth. As described above, the performance information may include metrics for at least one network performance indicator. For example, the at least one network performance indicator may comprise at least one of: a bandwidth, a throughput, a latency, a packet loss, a jitter, a round trip time, or the like. Alternatively, or in addition, in one example, the at least one network performance indicator may comprise a video quality metric, an audio quality metric, or the like (such as the track/bitrate in accordance with adaptive bitrate (ABR) logic, or other audio and/or visual quality metrics, such as an estimated mean opinion score (MOS), a video multi-method assessment fusion (VMAF) score, or the like). In one example, the performance information may comprise one or both of uplink performance information and downlink performance information (e.g., at least one uplink network performance indicator metric and/or at least one downlink network performance indicator metric). The wireless access networks may include at least one of: at least one cellular access network, at least one non-cellular wireless access network, and/or at least one satellite access network, and so forth.

In one example, step 310 may include receiving a plurality of broadcasts from the plurality of wireless access networks. For instance, each broadcast of the plurality of broadcasts may comprise respective performance information for a respective one of the plurality of wireless access networks. In one example, step 310 may alternatively or additionally include establishing a plurality of connections to the plurality of wireless access networks and measuring at least one network performance indicator for each wireless access network of the plurality of wireless access networks in accordance with each connection of the plurality of connections to obtain respective network performance indicator metrics for the at least one network performance indicator. To illustrate, the measuring may include applying at least a first test protocol associated with the first process. For instance, the at least the first test protocol may include a plurality of communications with at least a first server associated with the at least the first service via the plurality of connections to the plurality of wireless access networks. In such an example, the respective network performance indicator metric for each wireless access network of the plurality of wireless access networks may be in accordance with each communication of the plurality of communications with the at least the first server. In one example, step 310 may further include storing the respective performance information, or data derived from the respective performance information (e.g., aggregate performance metrics, which may also be considered to be part of the respective performance information). In one example, step 310 may further include closing each connection after the measuring.

In connection with the measuring, the at least the first server may comprise a video server (such as network components 155, servers 125, nodes 185, or the like in the example of FIG. 1), a conference server (e.g., servers 135, servers 125, nodes 185, etc.), a content distribution network node (e.g., nodes 185), a server of a cloud computing platform (e.g., nodes 185, servers 135, etc.), a customer premises-based server (e.g., servers 125), and so forth. In this regard, it should be noted that different CDN nodes may be reached via different wireless access networks, where the different CDN nodes may have the same content available, and where performance of the connections via different wireless access networks to the same or different CDN nodes may be measured (and subsequently compared/used for network selection in connection with one or more service requests from processes in operation on the endpoint device). Similarly, a cloud computing platform may offer redundant resources at different locations (e.g., different physical infrastructure). However, different paths to the same physical infrastructure may be established via different wireless access networks. It should also be noted that a customer premises based-server may be designated by an organization for endpoint devices establishing remote connections to a LAN of an organization, e.g., a LAN of the user's employer, etc. In one example, a video server may be for ABR video, and video and/or audio quality such as the track/bitrate, etc. may be measured/obtained as described above. In still another example, a conference server may provide hosting of VoIP conferences, online meetings, etc. Other servers may be contacted in accordance with test protocols for various other processes/services/applications and/or for various other process/service/application types in accordance with the present disclosure.

At step 320, the processing system receives a service request from a first process in operation on the endpoint device. For instance, the process may be associated with an application and/or a service in operation on the endpoint device. For instance, the service request may be a request to establish a connection to a remote server or other computing devices and/or a request that involves a requirement to establish a network connection. The first process may be a service, process, thread, or the like that is associated with a device application, such as a video streaming application, a web browsing application, a gaming application, a social medial application, a messaging application, an online conferencing application, and so forth. It should be noted that the first process may also be associated with an application that is not a "user application," such as a background process for operating system updates, hardware driver updates, and so forth.

At step 330, the processing system selects, in response to the service request, a first wireless access network of the plurality of wireless access networks for the first process based upon the performance information of the plurality of wireless access networks. In one example, the selecting may be in accordance with a selection function (or "selection logic") of the processing system (e.g., implemented/performed by the processing system), where the selection function comprises a plurality of factors. For instance, the plurality of factors may include at least one factor associated with the at least one network performance indicator. To illustrate, the at least one factor may comprise a preference for at least one network performance indicator metric, e.g., a minimum requirement, or the like, such as a minimum throughput, a maximum packet loss ratio, etc. The plurality of factors may alternatively or additional include one or more of a cost factor, a security factor, or a mobility factor, etc. For example, a security factor may include a requirement or preference that there is a particular encryption protocol used by the wireless access network, or an order of preference for different protocols, a minimum threshold for security below which a connection is to not be permitted, etc. In addition, a mobility factor may comprise one or more inputs that indicate whether the endpoint device is at rest, in motion, or is expected to be in motion, a modality of movement (e.g., walking, city bus, vehicle on highway, boat, etc.), and so forth. A cost factor may comprise one or more inputs indicative of a monetary cost or resource utilization consumption associated with a use of a wireless access network. For instance, independent cellular hotspots may be made available by individuals/entities and may earn rewards from MNOs for data quantities offloaded from MNO-controlled base stations or other MNO infrastructures, e.g., according to defined agreements with one or more MNO(s). However, there may be monetary costs associated with operating cellular base stations, such as power consumption costs, wear and tear/depreciation, etc. In one example, a network operator may provide estimated cost information to the endpoint device for storage thereon and for use in connection with the present examples. Alternatively, or in addition, there may be estimated costs or other value(s) indicative of cost that may be associated with wireless network access element types. Thus, a cellular base station may have an associated cost value, an independent Wi-Fi access point may have another cost value, and so forth. Still other factors may include inputs indicating whether the endpoint device is indoors versus outdoors, a battery charge level (e.g., low, medium, high, full, and/or a percentage of full capacity, a remaining number of amp-hours or the like), and so forth.

In one example, the selection function (or "selection logic") may be associated with the first process, where the processing system may store a plurality of selection functions associated with a plurality of processes in operation on the endpoint device. For instance, the selection function may be associated with a first process type, where the first process is of the first process type, and where the processing system stores a plurality of selection functions associated with a plurality of process types in operation on the endpoint device. As described above, process types may include "video process type," "voice process type," "gaming process type," "messaging process type," "general purpose process type," etc. In various examples, the selection function may comprise a formula, an AI and/or ML algorithm, e.g., a decision tree, a binary classifier, etc. For instance, the selection function may generate a score for each available wireless access network from among which a wireless access network with a highest score, a lowest score, the lowest absolute value, etc. may be selected. In one example, factors such as described above may comprise an input vector to the selection logic, in response to which the selection logic may generate an output (e.g. the score(s) for the available wireless access network(s)). For instance, respective values for different factors may be included in or extracted/calculated from network performance indicators obtained via step 310.

At step 340, the processing system establishes a communication session for the first process via the first wireless access network that is selected. For instance, step 340 may include requesting and/or negotiating parameters of the communication session in accordance with the requirements or preferences of the process/application. For instance, a video application may have a minimum throughput, a maximum acceptable delay measure, etc. In one example, the test protocol(s) may be specific to testing the available wireless access networks to identify those that are able to meet such demand(s) and/or to identify the wireless access network that is best able to meet or exceed these demand(s). It should be noted that in one example, the selection function may not simply select the wireless access network with the highest throughput and/or lowest packet loss ratio. For instance, in one example, the selection function may select a lowest cost wireless access network that meets the process/application demands. In any case, when establishing the communication session, it is expected that the selected wireless access network (e.g., the "first" wireless access network) can meet the demand(s) of the process/application. Nevertheless, in one example, the processing system may request and/or negotiate a particular reserved bandwidth, a quality of service, service class, or the like for the connection, and so forth. In the case that the first wireless access network that is selected comprises a cellular network, other air interface characteristics may also be established at step 340, such as the number of aggregated carriers, a coding rate, a number of multiple input/multiple output (MIMO) layers, a modulation order/number of bits per symbol (e.g., for binary phase shift keying (BPSK), quadrature phase shift keying (QPSK), 16 quadrature amplitude modulation (16QAM), etc.), a number of physical resource blocks (PRBs), and so forth. Similar, air interface characteristics may also be established in examples in which the first wireless access network comprises a Wi-Fi network, a satellite network, etc. In one example, the establishing of the communication session at step 340 may be in accordance with other connection information indicated by the process/application, such as a uniform resource locator (URL), an IP address, or the like of a remote server, and so forth.

Following step 340, the method 300 ends in step 395. It should be noted that method 300 may be expanded to include additional steps, or may be modified to replace steps with different steps, to combine steps, to omit steps, to perform steps in a different order, and so forth. For instance, in one example, the processing system may repeat one or more steps of the method 300, such as steps 320-340 for one or more additional processes, step 310 on an ongoing basis as the endpoint device moves throughout an environment and/or as time progresses and as network performance may change, and so forth. It should be noted that step 310 may include applying a plurality of test protocols associated with a plurality of processes in operation on the endpoint device including at least the first process. For instance, the plurality of processes may include a first process associated with a first video application and a second process associated with a second video application that is different from the first video application. In one example, the first video application may be associated with at least a first video server that is accessible via the plurality of wireless networks, and the second video application may be associated with at least a second video server that is accessible via the plurality of wireless networks and that is different from the at least the first video server. Accordingly, respective performance indicator metrics may be obtained for the plurality of different wireless access networks in connection with test protocols associated with the different processes/applications. It should be noted that performance indicator metrics for other processes and/or other process types may similarly be obtained on an ongoing basis by obtaining broadcast metrics and/or by running test protocols via various available wireless access networks. As such, the processing system may respond to different requests, and may select wireless access networks and establish communication sessions independently for the respective processes/applications through different iterations of steps 320-340.

In one example, e.g., in the case of a web browser application, the first process may provide new/updated service requests in response to the demands of specific websites. For instance, a user may be reading a news article on a news website, but may then navigate to webpage with embedded streaming video, e.g., a video news segment. In this case, a new/updated service request may indicate a "streaming video" request, a "high quality video" request, a "medium quality video" request, a "low quality video" request, or the like. In response, a new/different wireless access network may be selected, an existing communication session via the first wireless access network may be identified as being sufficient to accommodate the anticipated increased demand relating to web browser-based video streaming and/or may be updated to accommodate the additional demand (e.g., by requesting allocation of one or more additional bearers, etc.), and so forth. Accordingly, steps 310-340 and/or steps 320-340 may be repeated to accommodate updates from one or more processes in operation on the endpoint device with network communication demands.

In one example, the method 300 may be expanded to include applying input vectors to the selection function for the first process (or for the process/service/application type) to identify a recommended wireless access network from among the plurality of available wireless access networks and/or to generate scores/rankings for respective wireless access networks that can be stored by the processing system. Thus, in one example, step 330 may include accessing the stored recommendation, or selecting a top ranked wireless access network from among a list of available wireless access networks according to the respective scores associated with the first process and/or the process/service/application type. Similarly, in one example, the method 300 may be modified to include permitting the first process to access the performance information of the plurality of wireless access networks. For instance, the processing system may obtain a request from the first process and may provide a recommended wireless access network and/or rankings/scores from which the first process may select a wireless access network. Alternatively, or in addition, the first process/application may include the selection function/logic that is specific to that particular process/application. In one example, other processes/applications may similarly comprise respective selection functions and may access performance information stored by the processing system to choose the appropriate wireless access network(s) in response to specific requests and the demands of the respective application associated therewith.

In one example, the method 300 may include obtaining one or more input factors for step 330 from a network-based data storage element (e.g., one or more performance metric values for one or more wireless access networks that may be stored by the endpoint device's MNO, or the like), obtaining weather data, etc. In one example, the method 300 may be expanded or modified to include steps, functions, and/or operations, or other features described in connection with the example(s) of FIGS. 1 and 2, or as described elsewhere herein. In addition, in one example, the method 300 or another method (e.g., performed by a network-based processing system, such as servers 135 of FIG. 1 or the like) may include selection function training, testing, etc., as described above. Thus, these and other modifications are all contemplated within the scope of the present disclosure.

In addition, although not specifically specified, one or more steps, functions, or operations of the method 300 may include a storing, displaying, and/or outputting step as required for a particular application. In other words, any data, records, fields, and/or intermediate results discussed in the method 300 can be stored, displayed and/or outputted either on the device executing the method 300, or to another device, as required for a particular application. Furthermore, steps, blocks, functions, or operations in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the examples of the present disclosure.

Figure 4:
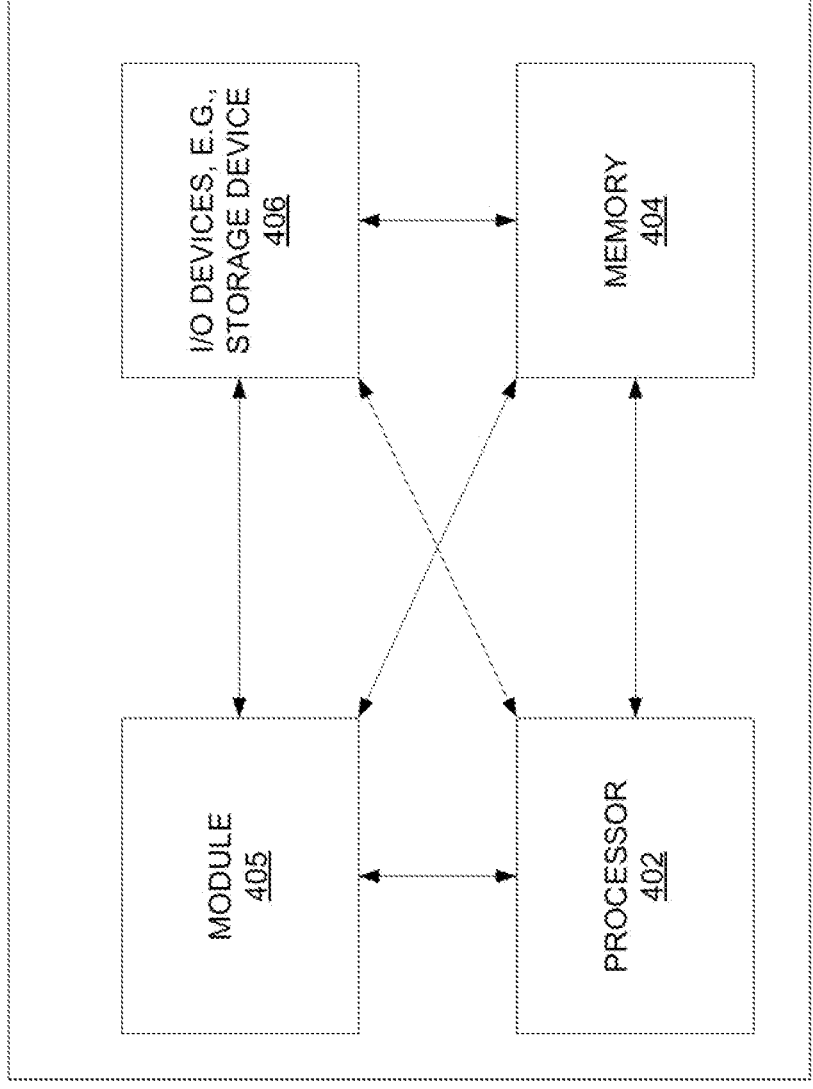
FIG. 4 illustrates a high-level block diagram of a computing device specially programmed to perform the functions described herein.

FIG. 4 depicts a high-level block diagram of a computing device or processing system specifically programmed to perform the functions described herein. For example, any one or more components or devices illustrated in FIG. 1, or described in connection with the examples of FIGS. 2 and 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for establishing a communication session for a first process in operation on an endpoint device via a first wireless access network that is selected based upon performance information of a plurality of wireless access networks, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in FIG. 4, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 4 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for establishing a communication session for a first process in operation on an endpoint device via a first wireless access network that is selected based upon performance information of a plurality of wireless access networks (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for establishing a communication session for a first process in operation on an endpoint device via a first wireless access network that is selected based upon performance information of a plurality of wireless access networks (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   obtaining, by a processing system including at least one processor of an endpoint device, performance information of a plurality of wireless access networks in a vicinity of the endpoint device, wherein the performance information includes metrics for a plurality of network performance indicators associated with at least one of the plurality of wireless access networks;

receiving, by the processing system, a service request from a first process in operation on the endpoint device;

selecting, by the processing system in response to the service request, a first wireless access network of the plurality of wireless access networks for the first process based upon the performance information of the plurality of wireless access networks, wherein the selecting is in accordance with a selection function comprising at least one machine learning model, and wherein the selection function comprises a plurality of factors associated with the plurality of network performance indicators; and establishing, by the processing system, a communication session for the first process via the first wireless access network.

2. The method of claim 1, wherein the performance information includes metrics for at least one network performance indicator, wherein the selecting is in accordance with a selection function, wherein the selection function comprises a plurality of factors, wherein the plurality of factors further includes at least one of:

at least one factor associated with the at least one network performance indicator;

a cost factor;

a security factor; or a mobility factor.

3. The method of claim 2, wherein the selection function is associated with the first process, and wherein the processing system stores a plurality of selection functions associated with a plurality of processes in operation on the endpoint device.

4. The method of claim 2, wherein the selection function is associated with a first process type, wherein the first process is of the first process type, and wherein the processing system stores a plurality of selection functions associated with a plurality of process types in operation on the endpoint device.

5. The method of claim 1, wherein the obtaining comprises:

receiving a plurality of broadcasts from the plurality of wireless access networks, each broadcast of the plurality of broadcasts comprising respective performance information for a respective one of the plurality of wireless access networks.

6. The method of claim 1, wherein the performance information comprises at least one metric for at least one network performance indicator of the plurality of network performance indicators, and wherein the at least one network performance indicator comprises at least one of:

a bandwidth;

a throughput;

a latency;

a packet loss;

a jitter; or a round trip time.

7. The method of claim 1, wherein the performance information comprises at least one metric for at least one network performance indicator of the plurality of network performance indicators, and wherein the at least one network performance indicator comprises at least one of:

a video quality metric; or an audio quality metric.

8. The method of claim 1, wherein the performance information comprises uplink performance information and downlink performance information.

9. The method of claim 1, wherein the obtaining comprises:

establishing a plurality of connections to the plurality of wireless access networks; and measuring at least one network performance indicator of the plurality of network performance indicators for each wireless access network of the plurality of wireless access networks in accordance with each connection of the plurality of connections to obtain respective network performance indicator metrics for the at least one network performance indicator.

10. The method of claim 9, wherein the obtaining further comprises:

closing each connection after the measuring.

11. The method of claim 9, wherein the measuring comprises:

applying at least a first test protocol associated with the first process.

12. The method of claim 11, wherein the at least the first test protocol includes a plurality of communications with at least a first server associated with the at least the first service via the plurality of connections to the plurality of wireless access networks.

13. The method of claim 12, wherein the respective network performance indicator metric for each wireless access network of the plurality of wireless access networks is in accordance with each communication of the plurality of communications with the at least the first server.

14. The method of claim 12, wherein the at least the first server comprises:

a video server;

a conference server;

a content distribution network node;

a server of a cloud computing platform; or a customer premises-based server.

15. The method of claim 9, wherein the measuring comprises:

applying a plurality of test protocols associated with a plurality of processes in operation on the endpoint device including at least the first process.

16. The method of claim 15, wherein the plurality of processes includes the first process associated with a first video application and a second process associated with a second video application that is different from the first video application.

17. The method of claim 16, wherein the first video application is associated with at least a first video server that is accessible via the plurality of wireless networks, and wherein the second video application is associated with at least a second video server that is accessible via the plurality of wireless networks and that is different from the at least the first video server.

18. The method of claim 1, wherein the processing system comprises a mobile chipset of the endpoint device.

19. A non-transitory computer-readable medium storing instructions which, when executed by a processing system including at least one processor of an endpoint device, cause the processing system to perform operations, the operations comprising:

obtaining performance information of a plurality of wireless access networks in a vicinity of the endpoint device, wherein the performance information includes metrics for a plurality of network performance indicators associated with at least one of the plurality of wireless access networks;

receiving a service request from a first process in operation on the endpoint device;

selecting, in response to the service request, a first wireless access network of the plurality of wireless access networks for the first process based upon the performance information of the plurality of wireless access networks, wherein the selecting is in accordance with a selection function comprising at least one machine learning model, and wherein the selection function comprises a plurality of factors associated with the plurality of network performance indicators; and establishing a communication session for the first process via the first wireless access network.

20. An apparatus comprising:

a processing system including at least one processor of an endpoint device; and a computer-readable medium storing instructions which, when executed by the processing system, cause the processing system to perform operations, the operations comprising:

obtaining performance information of a plurality of wireless access networks in a vicinity of the endpoint device, wherein the performance information includes metrics for a plurality of network performance indicators associated with at least one of the plurality of wireless access networks;

receiving a service request from a first process in operation on the endpoint device;

selecting, in response to the service request, a first wireless access network of the plurality of wireless access networks for the first process based upon the performance information of the plurality of wireless access networks, wherein the selecting is in accordance with a selection function comprising at least one machine learning model, and wherein the selection function comprises a plurality of factors associated with the plurality of network performance indicators; and establishing a communication session for the first process via the first wireless access network.

* * * * *